United States Patent [19]
Shichiken et al.

[11] Patent Number: 6,098,419
[45] Date of Patent: Aug. 8, 2000

[54] AIR CONDITIONER CASE

[76] Inventors: Yutaka Shichiken; Masayuki Murase; Hiroshi Nakajima, all of c/o Zexel Corporation Konan Factory, 39, Oaza-Sendai Aza-Higashihara, Konan-machi, Saitama, Japan, 360-01

[21] Appl. No.: 09/015,619

[22] Filed: Jan. 29, 1998

[30] Foreign Application Priority Data

Jan. 31, 1997 [JP] Japan .................................. 9-032844

[51] Int. Cl.[7] .................................................. F25D 17/04
[52] U.S. Cl. .............................. 62/404; 454/69; 454/143
[58] Field of Search .............................. 62/404; 454/69, 454/143

[56] References Cited

U.S. PATENT DOCUMENTS

| | | | |
|---|---|---|---|
| 4,324,286 | 4/1982 | Brett | 165/2 |
| 4,413,550 | 11/1983 | Piano | 98/2 |
| 4,783,115 | 11/1988 | Galubensky et al. | 296/208 |
| 4,913,034 | 4/1990 | Ripple et al. | 98/2.11 |
| 5,649,429 | 7/1997 | Schreiber | 62/186 |

*Primary Examiner*—Henry Bennett
*Assistant Examiner*—Mark Shulman

[57] ABSTRACT

In constituting an air conditioner case by bonding a first case member having a cooling air intake chamber and a second case member that is not provided with a cooling air intake chamber, the cooling air intake chamber is formed in a direction that is perpendicular to an air intake port and a blower mounting hole, opening via an opening portion. A mounting plate provided with a regulator is mounted at the opening portion. Thus, since a partitioning wall and barrier walls defining the periphery of the cooling air intake chamber can be formed at the same time as the formation of the case main body of the first case member, it is not necessary to further divide the first case member.

3 Claims, 5 Drawing Sheets

AIR CONDITIONER CASE

BACKGROUND OF THE INVENTION

The present invention relates to an air conditioner case and in particular, it relates to an air conditioner case employed in an air conditioning system for vehicles.

In recent years, in order to reduce the number of required parts and production costs, air conditioner cases for air conditioning systems in vehicles have been produced with the blower case and the temperature controller case integrated.

At the same time, a structure in which, as shown in FIG. 6 of Japanese Examined Utility Model Publication No. S 62-4720, an air passage (11) is provided on the outside of a scroll nose portion (1b) of a blower case (1) with its periphery defined by the scroll nose portion (1b) and an inclining wall to form a roughly triangular shape in cross section with the two sides in the direction of the axis of the blower blocked off by a wall, a cooling air intake port (7) that communicates with the air passage (11) is provided in an area at the downstream side of the scroll nose portion (1b) and a hose connecting hole (18) where a hose (9) that connects the air passage (11) to the inside of the housing of a blower motor (5) is connected is provided, so that the air that has flowed out to the scroll nose portion (1b) is caused to flow back into the housing of the motor (5) from the cooling air intake port (7) via the air passage (11) and an air passage (9) to cool the blower motor. This structure has become common. It is to be noted that the reference numbers in parentheses in this paragraph indicate the reference numbers used in Japanese Examined Utility Model Publication No. S 62-4720.

Also becoming common is the structure in which, as shown in FIGS. 1 and 2 of Japanese Unexamined Utility Model Publication No. S 62-149414, a cooling air intake chamber (8) is provided adjacent to the scroll nose portion (7) with its periphery defined by a partitioning wall (4), a side wall (2a) and a barrier wall (9) provided diagonally from the end edge of the partitioning wall (4) and bent backward toward the outside, and a regulator (11) to form a roughly triangular shape is provided at the cooling air intake chamber (8) so that the regulator (11) is cooled by the air supplied through an inflow port (10) that communicates between the scroll nose portion (7) and the cooling air intake chamber (8). It is to be noted that the reference numbers in parentheses in this paragraph indicate the numbers used in Japanese Unexamined Utility Model Publication No. S 62-149414.

In an air conditioner case provided with an air passage or a cooling air intake chamber at the scroll nose portion as disclosed in the two publications mentioned above, since the air passage or the cooling air intake chamber is a closed off chamber whose periphery is enclosed by walls, it is necessary to divide the air passage or the cooling air intake chamber if the air conditioner case is to be manufactured by such means as injection molding.

At the same time, in an air conditioner case in which the air blower case and the temperature controller case are constituted as an integrated unit, it is necessary to divide the air conditioner case into upper and lower portions relative to the direction of airflow so that a heat exchanger can be mounted and disengaged with ease.

Thus, when the blower case and the temperature controller case are constituted as an integrated unit while adopting the structure described above for the air passage or the cooling air intake chamber, the air conditioner case must be manufactured by using at least three separate members and bonding them together.

However, manufacturing an air conditioner case in this manner, using three separate members and performing separate processes for the individual members, presents problems in that the number of manufacturing steps to complete the air conditioner case as a whole increases, resulting in more complicated production work and in that the production cost also increases.

SUMMARY OF THE INVENTION

Accordingly, an object of the present invention is to provide an air conditioner case with a blower case and a temperature controller case formed as an integrated unit and a cooling air intake chamber that constitutes the means for blower cooling formed between the blower case and the temperature controller case, which can be easily constituted by using two case members.

Namely, the air conditioner case according to the present invention comprises: a blower case unit provided with a distended portion formed in a roughly cylindrical shape, an air intake port for taking in air formed at one side thereof and a blower mounting hole for inserting a blower formed at the other side thereof; a temperature controller case unit located at the downstream side of the blower case unit, in which at least a heat exchanger is housed; and a scroll nose portion located at the boundary of the blower case unit and the temperature controller case unit, which is provided with a cooling air intake chamber. The blower case unit and the temperature controller case unit are formed by bonding a first case member and a second case member, with the first case member having an semi-circular portion to constitute the air intake port and an semi-circular portion to constitute the blower mounting hole and also having the cooling air intake chamber, and the second case member having an semi-circular portion to constitute the air intake port and an semi-circular portion to constitute the blower mounting hole. The cooling air intake chamber is defined by a partitioning wall rising perpendicular to the opening of the blower mounting hole and the air intake port from the scroll nose portion, a barrier wall that constitutes a bottom surface extending out from the lower edge side of the partitioning wall and three barrier walls that constitute side surfaces that stand erect and perpendicular to the three edge sides of the barrier wall that constitutes the bottom surface, with an opening portion formed over an area approximately equal in size to the cross sectional area of the cooling air intake chamber at the side opposite from the barrier wall constituting the bottom surface of the cooling air intake chamber, opening in a direction perpendicular to the blower mounting hole, an air inflow hole formed at the barrier wall among the three barrier walls constituting the side surfaces of the cooling air intake chamber that is the closest to the temperature controller case unit and an air outflow hole is formed at the barrier wall among the three barrier walls constituting the side surfaces of the cooling air intake chamber that is located at the side where the blower mounting hole is provided.

With this, since the cooling air intake chamber opens in a direction that is perpendicular relative to the air intake port and the blower mounting hole, the side walls and the bottom wall that enclose the periphery of the air intake chamber can all be formed together when the first case member is formed. Then, by utilizing the side core for a delivery port that opens in the same direction as the blower mounting hole relative to the cooling air intake chamber, molding can be completed during the formation of the first case member.

In addition, by blocking off the opening portion of the cooling air intake chamber with a mounting plate provided with a regulator to shut off the cooling air intake chamber from the outside as in the examples of the prior art described earlier, the air that has flowed into the cooling air intake chamber from the air passage can be delivered to the motor through the delivery port and the regulator can be cooled with the air that has flowed into the cooling air intake chamber.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate a preferred embodiment. In the drawings.

DETAILED DESCRIPTION OF THE PREFERRED EMBODIMENT

The following is an explanation of the present invention in reference to the drawings.

Figure 1:
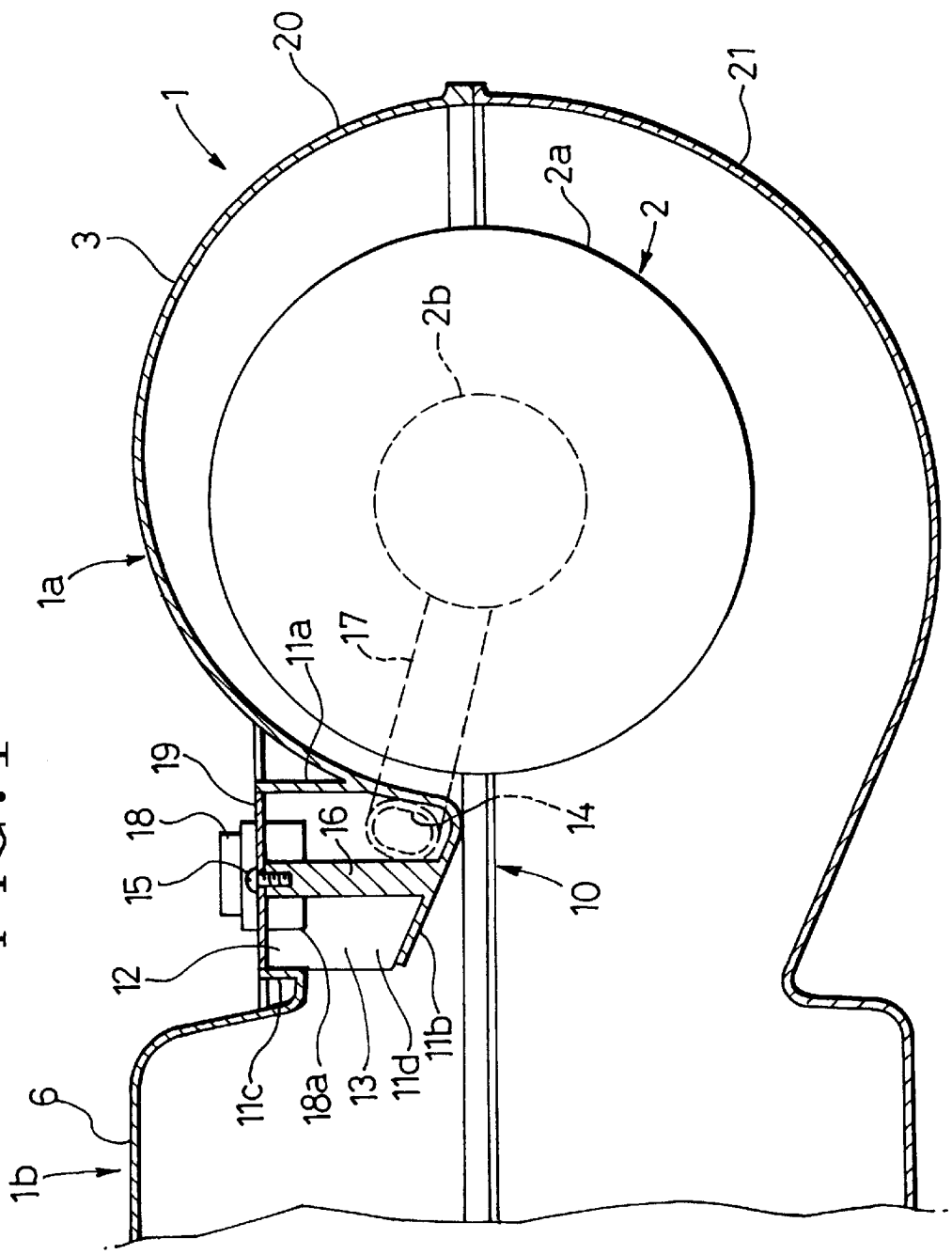
FIG. 1 is a cross section illustrating the structure of the air conditioner unit according to the present invention.
Figure 2:
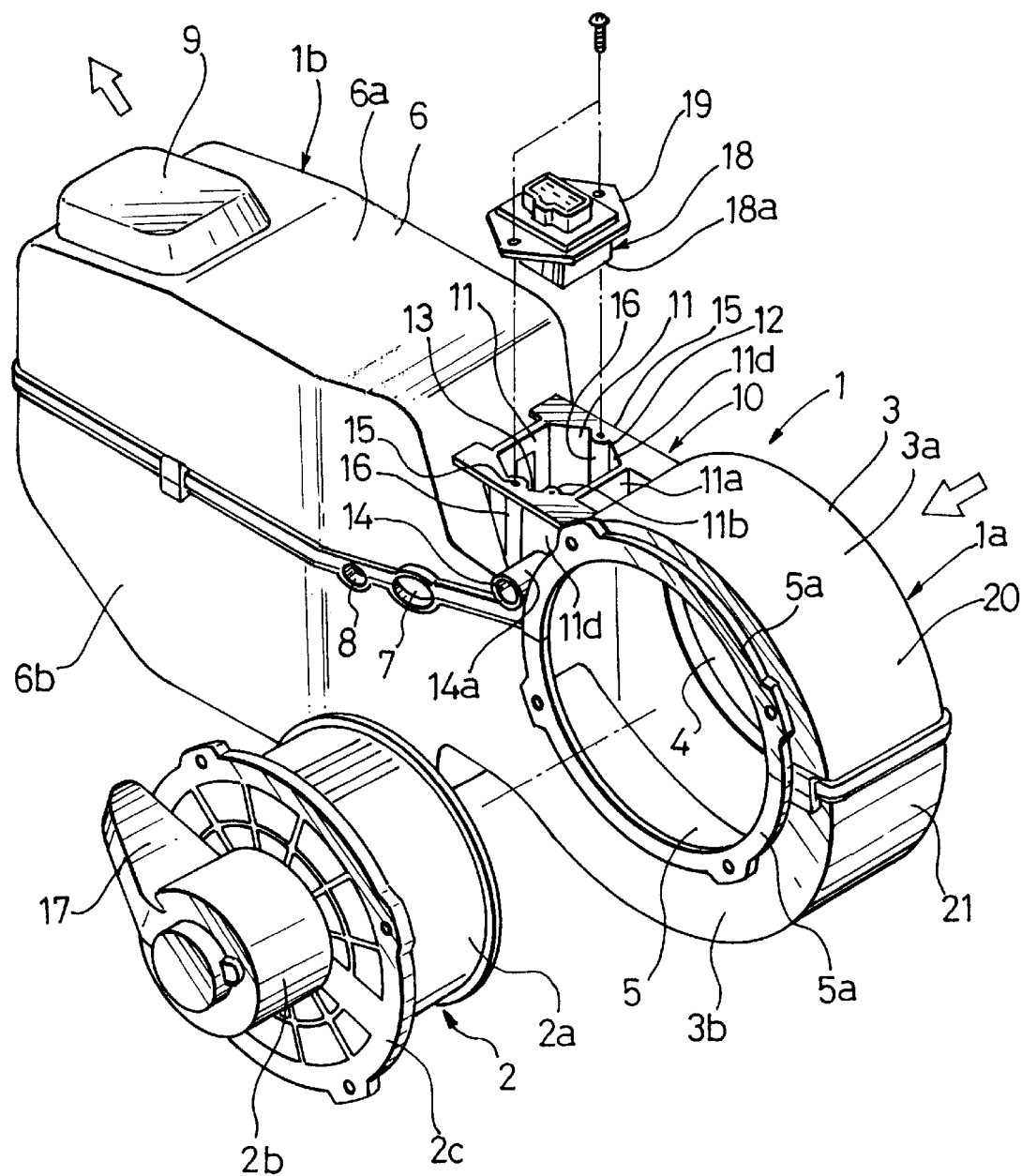
FIG. 2 is a perspective illustrating the step in which the regulator and the blower are mounted in the air conditioner unit shown in FIG. 1.
Figure 3:
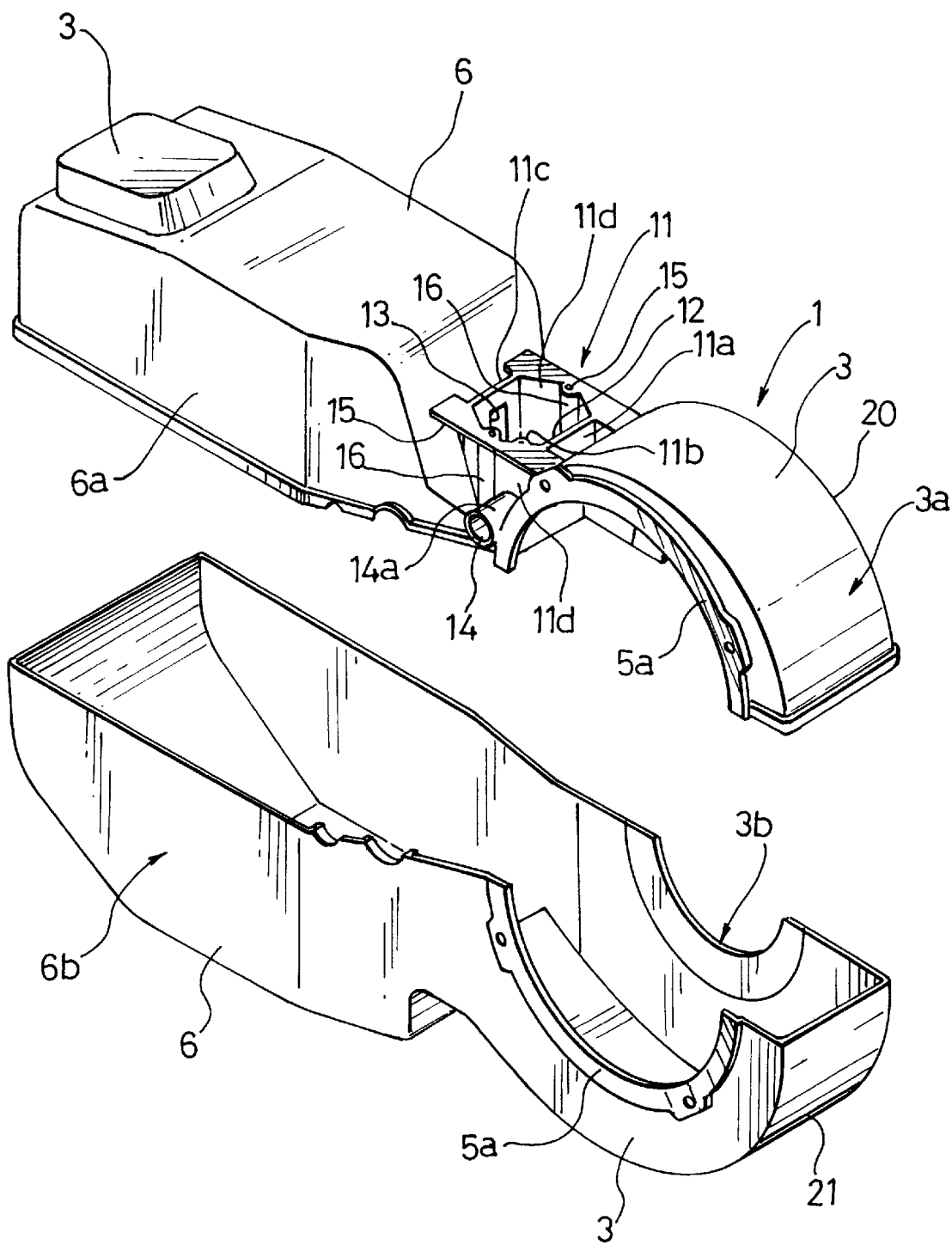
FIG. 3 is a perspective illustrating the structure of the case of the air conditioner unit in FIG. 1 that is constituted of a first case member and a second case member.

FIGS. 1, 2 and 3 show the structure of an air conditioner unit 1 according to the present invention which is employed in vehicles or the like. The air conditioner unit 1 is provided with a blower unit part 1a that houses a blower 2 constituted of a fan portion 2a and a motor portion 2b, and a temperature controller unit part 1b that houses temperature controller devices such as a heat exchanger and the like.

A blower case unit 3 that constitutes the outer frame of the blower unit part 1a is formed in a roughly cylindrical shape, and at one of its sides that face opposite each other, an air intake port 4 for taking in air is provided, whereas at the other side, a blower mounting hole 5, in which the blower 2 is inserted from the direction of the axis of the fan portion 2a is provided.

In addition, a temperature controller case unit 6 that constitutes the outer frame of the temperature controller unit part 1b constitutes an integrated unit together with the blower case unit 3. At a side of the temperature controller case unit 6, communicating holes 7 and 8 for leading the piping extending from the heat exchanger to the outside are formed, and at the downstream-most side, a discharge port 9 for discharging air into the vehicle cabin is provided.

It is to be noted that the air conditioner unit 1 provided with the blower case unit 3 and the temperature controller case unit 6 is formed by bonding a first case member 20 and a second case member 21 face-to-face, which will be positioned in an upper and lower orientation when the air conditioner unit 1 is installed. The air intake port 4, the blower mounting hole 5 and the communicating holes 7 and 8 are formed by bonding the first and second case members 20 and 21 face-to-face. This structure facilities mounting and disengaging the heat exchanger from the temperature controller unit part 1b.

At a scroll nose portion 12, located at the boundary of the blower case unit 3 and the temperature controller case unit 6, a cooling air intake chamber 11 for cooling the motor of the blower 2 is formed. This cooling air intake chamber 11 is defined by a partitioning wall 11a, the barrier wall 11b provided diagonally from the lower edge side of the partitioning wall 11a and barrier walls 11c, 11d and 11d that stand erect and perpendicular at the side where an opening portion 12 is located from the three edge sides of the barrier wall 11b, and is formed in a box shape having the opening portion 12 at the top. A rectangular inflow port 13 opens at the barrier wall 11c, and at one of the barrier walls 11d and 11d where the blower mounting hole 5 opens, a projecting portion 14a that projects out in the direction of the axis of the blower 2 is formed having a delivery port 14 that passes through the projecting portion 14a.

A regulator 18 is provided to regulate the voltage applied to the motor of the blower 2, and it is mounted at a mounting plate 19 for blocking off the opening portion 12 of the cooling air intake chamber 11 in such a manner that its heat discharge portion 18a is positioned within the cooling air intake chamber 11.

The first case member 20 is constituted of a roughly semi-cylindrical portion 3a that is to constitute the blower case unit 3 for housing the fan 2a of the blower 2 and a roughly box-shaped portion 6b that is to constitute the temperature controller case unit 6 for housing the heat exchanger and the like, and is provided with the cooling air intake chamber 11 having the opening portion 12, the inflow port 13 and the delivery port 14.

In addition, the second case member 21 is constituted of a roughly semi-cylindrical portion 3b that is to constitute the blower case unit 3 together with the roughly semi-cylindrical member 3a of the first case member 20 and a roughly box-shaped portion 6b that is to constitute the temperature controller case unit 6 together with the roughly box-shaped portion 6a of the first case member 20.

In the air conditioner unit 1 structured as described above, a portion of the air that is taken in by the blower 2 through the air intake port 4 and is delivered toward the rear stream side travels around to flow into the cooling air intake chamber 11 from the inflow port 13 and then is caused to flow in reflux to the motor portion 2b of the blower 2 from the delivery port 14 via a blower tube 17. Thus, the motor portion 2b is cooled by this air and also since the heat discharge portion 18a of the regulator 18 is located within the cooling air intake chamber 11, the regulator 18 itself is cooled by this same air.

Next, an example of a manufacturing process for producing the air conditioner unit 1 structured as described above is explained in reference to FIGS. 2 through 6.

The first case member 20 and the second case member 21 that are to constitute the air conditioner unit 1 may be formed by employing an injection molding machine provided with dies that are formed in advance in specific shapes. The injection molding machine itself is of the prior art having, for instance, a die-closing mechanism, a material supply mechanism, an injection mechanism, a rotating mechanism and the like.

As shown in FIG. 3, for instance, the second case member 21 does not have any projections or the like that can work as hooks relative to the direction in which it opens at the inside or the outside since it is constituted of the roughly semi-cylindrical portion 3b and the roughly box-shaped portion 6b that are wide open at the top. Because of this, no problems arise during die opening even when a manufacturing method employing an injection molding machine is adopted.

On the other hand, as shown in FIG. 3, for instance, the first case member 20 is constituted of the roughly cylindrical portion 3a and the roughly box-shaped portion 6a, is wide open at the bottom and is provided with the cooling air intake chamber 11. Thus, in addition to an upper die 24 and a lower die 25 shown in FIGS. 4 through 6, side cores 26 and 27 for forming the cooling air intake chamber 11 are used.

Figure 4:
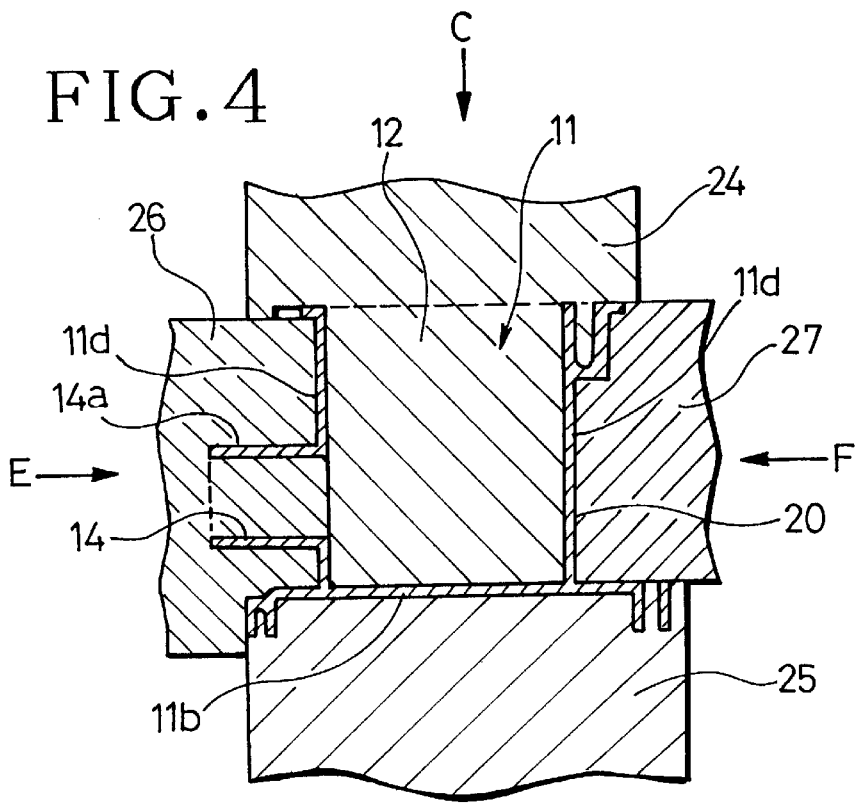
FIG. 4 is a front view illustrating a state in which the die is closed to form the air intake chamber.
Figure 5:
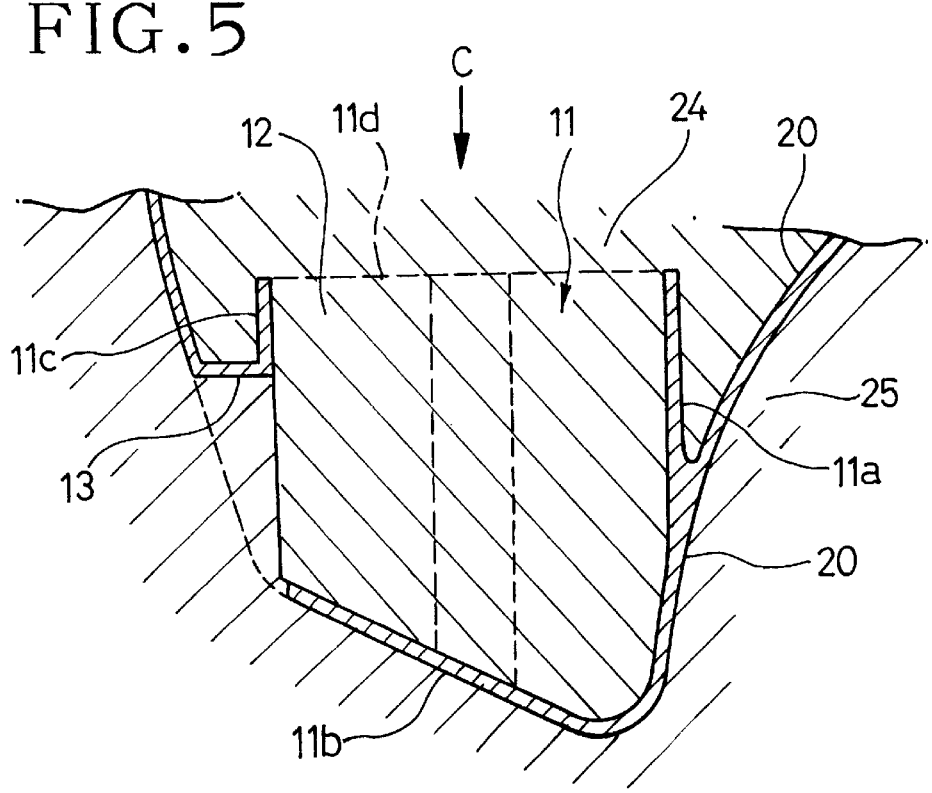
FIG. 5 is an enlargement of the state in which the die is closed to form the air intake chamber viewed from the side.

Namely, as shown in FIGS. 4 and 5, first, the upper die 24, which is formed in a specific shape, is moved in the direction indicated by the arrow C from above and die closing is performed using the lower die 25 (fixed side), which is formed in a specific shape. The upper die 24 and the lower die 25 form a gap that corresponds to the thickness of the entire first case member 20, and gaps that correspond to the thicknesses of the partitioning wall 11a, and the barrier walls 11b, 11c and 11d of the cooling air intake chamber 11. It is to be noted that, as shown in FIG. 5, the inflow port 13 is formed with the upper die 24 and the lower die 25 coming in contact with each other without creating a gap.

Next, the side cores 26 and 27 formed in specific shapes are moved in the directions indicated by the arrows E and F to be mounted at the upper die 24 and the lower die 25. With the upper die 24, the lower die 25 and the side core 26, a gap that corresponds to the thickness of the projecting portion 14a provided with the delivery port 14 is formed and also a gap that corresponds to the thickness of the flange at the circumferential edge of the opening portion is formed. Moreover, with the upper die 24, the lower die 25 and the side core 27, a gap that corresponds to the thickness of the flange 5a at the circumferential edge of the opening portion 5 is formed.

Then the raw material injected at a high pressure from the injection mechanism of the injection molding machine to fill the gaps for processing. After this, the casting is allowed to cool for a specific length of time.

Furthermore, the side cores 26 and 27 are moved in directions that are opposite from the mounting direction, i.e., the directions that are opposite from that indicated by the arrows E and F in FIG. 4, and the upper die 24 and the lower die 25 are moved in the direction that is opposite from the direction of die closing, i.e., the direction opposite from that indicated by the arrow C in FIGS. 4 and 5 to perform die opening. It is to be noted that during this die opening process, since the partitioning wall 11a and the barrier walls 11b, 11c and 11d of the cooling air intake chamber 11 are in a state in which they stand erect and perpendicular to the opening portion 12, the partitioning wall 11a and the barrier walls 11b, 11c and 11d of the cooling air intake chamber 11 do not pose any hindrance.

Figure 6:
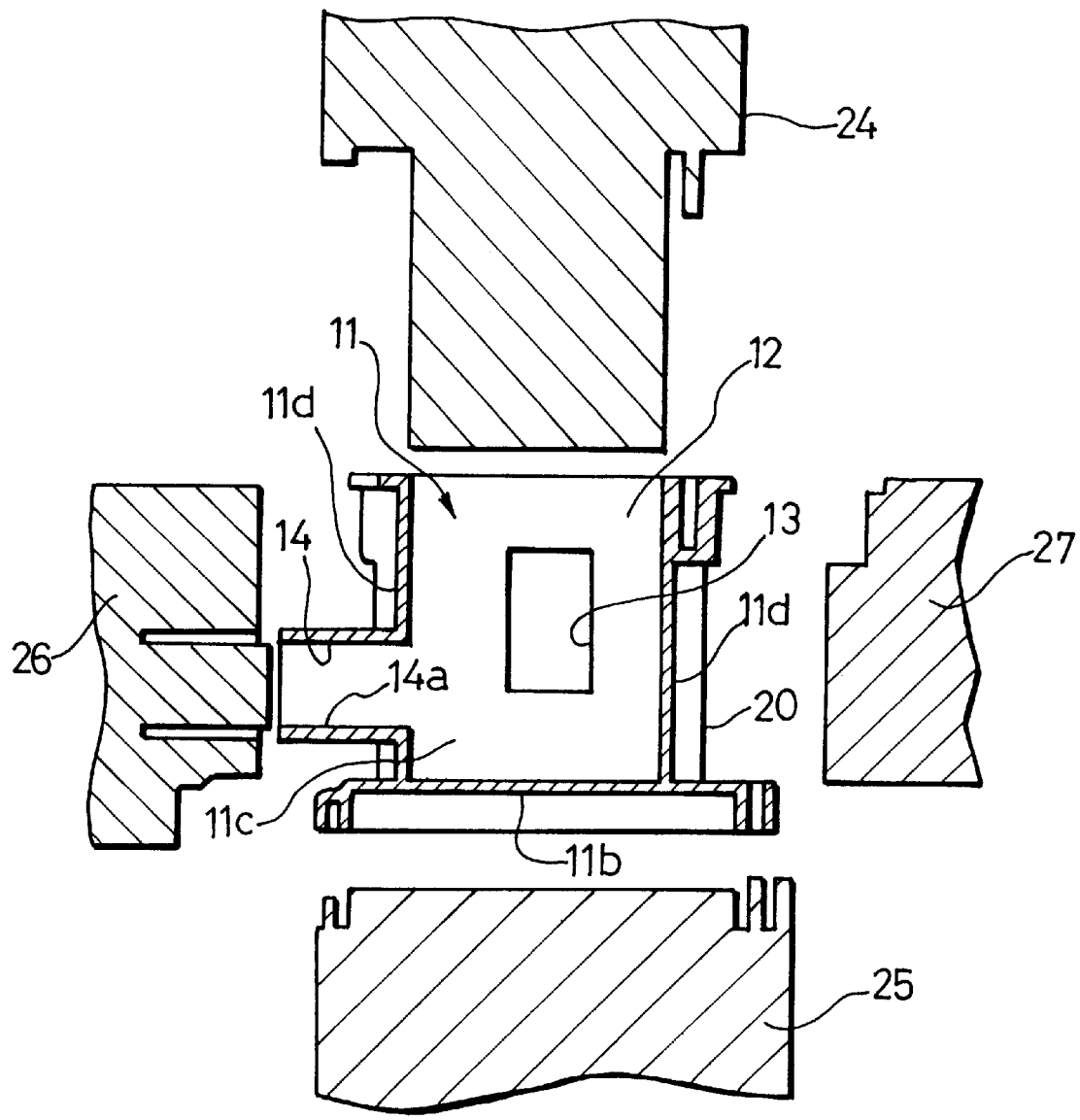
FIG. 6 is a front view illustrating the state in which the die is opened to form the air intake chamber.

With this, as shown in FIG. 6, the entire shape of the first case member 20 is formed. Also, the cooling air intake chamber 11 having the opening portion 12, the inflow port 13 and the delivery port 14 is formed at the same time. Consequently, the necessity for further forming more complex parts in the first case member 20 is eliminated, thereby achieving a reduction in the number of manufacturing steps required for manufacturing the case member 21 through injection molding or the like.

Then, the first case member 20 and the second case member 21 thus formed are bonded with the heat exchanger and the like housed inside, and, as shown in FIG. 2, the fan 2a is inserted through the blower mounting hole 5 and the flange portion 2c of the blower 2 and the flange 5a are placed in contact with each other and secured through screwing or the like to complete the mounting process for the blower 2. The regulator 18 is mounted at the cooling air intake chamber 11, and the opening portion 12 of the cooling air intake chamber 11 becomes blocked by the plate 19 where the regulator 18 is mounted. Thus, the air conditioner unit 1 is completed.

As has been explained, with the air conditioner case according to the present invention, since the cooling air intake chamber opens in a direction perpendicular to the air intake port and the blower mounting hole, the partitioning wall and the barrier walls enclosing the periphery of the cooling air intake chamber can be formed concurrently with the formation of the entire first case member.

In addition, the delivery port that opens in the same direction as the blower mounting hole relative to the cooling air intake chamber, too, can be formed at the same time by using the side cores. Thus, since it is not necessary to further form more detailed parts in the first case, the manufacturing process can be simplified, and it also becomes possible to reduce the production cost.

Furthermore, by blocking off the opening portion of the cooling air intake chamber with the mounting plate provided with the regulator, the cooling air intake chamber becomes cut off from the outside and, consequently, the air flowing into the air intake chamber from the air passage via the inflow port can be delivered out to the blower motor through the delivery port. Moreover, the same air can also be used to cool the regulator. In addition, since the plate that blocks off the cooling air intake chamber can also be used as the plate for mounting the regulator, a reduction in the number of parts is achieved, compared to a manufacturing method in which the regulator is directly mounted at the air passage.

What is claimed is:

1. An air conditioner case comprising:

a blower case unit provided with a distended portion formed in a roughly cylindrical shape, an air intake port for taking in air at one side thereof and a blower mounting hole for inserting a blower at another side thereof;

a temperature controller case unit located at the downstream side of said blower case unit, in which at least a heat exchanger is housed; and a scroll nose portion located at the boundary of said blower case unit and said temperature controller case unit, which is provided with a cooling air intake chamber, wherein:

said blower case unit and said temperature controller case unit are formed by bonding a first case member and a second case member;

said first case member includes a semi-circular edge portion for forming said air intake port and a semi-circular edge portion for forming said blower mounting hole and is provided with said cooling air intake chamber;

said second case member includes a semi-circular edge portion for forming said air intake port and a semi-circular edge portion for forming said blower mounting hole;

said cooling air intake chamber is defined by a partitioning wall standing erect and perpendicular to openings of said blower mounting hole and said air intake port from said scroll nose portion, a barrier wall extending out from a lower edge side of said partitioning wall to constitute a bottom surface thereof and three barrier walls that stand erect and perpendicular to three edge sides of said barrier wall to constitute side surfaces;

an opening portion is formed taking up an approximately equal area to the area of a cross section of said cooling air intake chamber at a side opposite from said barrier wall that constitutes said bottom surface of said cooling air intake chamber, and opens in a direction perpendicular to said blower mounting hole;

an air inflow port is formed at one of said three barrier walls constituting said side surfaces of said cooling air intake chamber that is located closest to said temperature controller case unit; and an air outflow port is formed at one of said three barrier walls constituting said side surfaces of said cooling air intake chamber that is located at a side where said blower mounting hole is provided.

2. An air conditioner case according to claim 1, wherein:

said opening portion of said cooling air intake chamber is blocked off by a mounting plate with a regulator for regulating a voltage applied to a blower motor mounted at a surface of said mounting plate located within said cooling air intake chamber.

3. An air conditioner case according to claim 1, wherein:

said first case member is manufactured by;

moving an upper die formed in a specific shape from above and performing die closing with a lower die formed in a specific shape to form a gap corresponding to a thickness of an entire shape of said first case member and gaps corresponding to the thicknesses of said partitioning wall and said barrier walls of said cooling air intake chamber;

then moving side cores formed in specific shapes from a direction perpendicular to the direction in which said upper die is moved and mounting said side cores at said upper die and said lower die to create a gap corresponding to the thickness of said projecting portion provided with said delivery port;

filling said gaps formed with said upper die said lower die and said side cores with raw material for processing and allowing the casting to cool down for a specific length of time, and moving said side cores in a direction opposite from the direction of mounting and moving said upper die in a direction opposite from the direction of die closing to perform die opening.

* * * * *